United States Patent

Watanabe et al.

[11] 4,054,798
[45] Oct. 18, 1977

[54] X-RAY CONVERSION SCREENS

[75] Inventors: Minoru Watanabe, Kawasaki; Ryoichi Kubo, Yokohama; Toshio Nishimura, Yokohama; Kazuto Yokota, Yokohma, all of Japan

[73] Assignee: Tokyo Shibaura Electric Co., Ltd., Kawasaki, Japan

[21] Appl. No.: 741,109

[22] Filed: Nov. 11, 1976

[30] Foreign Application Priority Data

Nov. 14, 1975 Japan .............................. 50-137018

[51] Int. Cl.$^2$ .............................................. G01J 1/58
[52] U.S. Cl. .................................... 250/483; 250/460; 252/301.4 H
[58] Field of Search ............... 252/301.4 H; 250/483, 250/460

[56] References Cited

U.S. PATENT DOCUMENTS

| | | | |
|---|---|---|---|
| 3,617,743 | 11/1971 | Rabatin | 250/483 |
| 3,872,309 | 3/1975 | DeBelder | 250/483 |
| 4,029,851 | 6/1977 | Degenhardt | 250/483 |
| Re. 28,592 | 10/1975 | Rabatin | 252/301.4 H |

Primary Examiner—Harold A. Dixon
Attorney, Agent, or Firm—Cushman, Darby & Cushman

[57] ABSTRACT

An X-ray conversion screen having reduced afterglow without any appreciable loss in the brightness under X-ray excitation comprises a substrate and at least one fluorescent layer applied thereto, the fluorescent layer containing a fluorescent substance which comprises terbium-activated lanthanum or gadolinium oxyhalide having yttrium or lutetium and, as desired, ytterbium added thereto as impurities.

8 Claims, 3 Drawing Figures

X-RAY CONVERSION SCREENS

This invention relates to X-ray conversion screens provided with at least one fluorescent layer containing a terbium-activated rare earth oxyhalide fluorescent substance.

More particularly, this invention relates to X-ray conversion screens provided with at least one fluorescent layer containing a rare earth oxyhalide fluorescent substance which has markedly reduced afterglow or phosphorescence.

The term "X-ray conversion screen," as used hereinafter and claims, comprehends X-ray intensifying screens, X-ray fluorescent screens, and input screens used in X-ray image intensifier tubes. X-ray fluorescent screens are employed for the purpose of making diagnosis by directly observing or photographing images produced thereon, as well as for purpose of detecting any X-ray leakage. X-ray image intensifier tubes are employed, in combination with a image pickup tube, for the purpose of making diagnosis by locating the affected part of the patient's body and observing it visually.

The use of the rare earth oxyhalides activated with terbium have recently been increasing as phosphors in X-ray conversion screens and similar X-ray radiographic devices, and replacing conventional phosphors heretofore in use for such purposes. For example, LaOBr: Tb has about a 50 percent greater absorption of incident X-rays and about three to four times greater blue emission than the previously used calcium tungsten (CaWO$_4$). Thus, it may be safely said that LaOBr: Tb is a phosphor more suitable for use in X-ray conversion screens than CaWO$_4$.

However, if conventional phosphors having an afterglow or long persistent phosphorescence of appreciable intensity are used in current X-ray photographic devices, any movement of the photographic film relative to the X-ray intensifying screen immediately after exposure will result in blurred images. Likewise, if the cassettes provided with an X-ray intensifying screen having still persisting phosphorescence are loaded with new films, the phosphorecence will cause the films to become exposed, and subsequent photographing will therefore result in double images. With cassetteless X-ray photographic devices which permit taking one photograph, for example, at intervals of 5 seconds, double images will also result if the X-ray intensifying screen has an afterglow persisting beyond each interval.

Experiments carried out by the inventors have revealed that, as a matter of practice, no problem will arise if the afterglow persisting 5 seconds after exposure is less than 30% of that existing 0.01 second after exposure.

Although many attempts to eliminate the above-described problems in phosphors for X-ray conversion screens have been made, no satisfactory results have been reported as yet, because any reduction in duration and intensity of the phosphor afterglow has normally been accompanied with the decrease of the phosphor brightness. In U.S. Pat. No. 3,666,676 of Rabatin et al., for example, there are disclosed terbium-activated rare earth oxyhalide phosphors containing the impurity ytterbium for reduced afterglow, such as LaOBr: TbYb and GdOBr: TbYb. But, these phosphors still have the disadvantage that the reduction of afterglow will be insufficient if ytterbium is added in smaller amounts, and on the contrary, the brightness will decrease if ytterbium is added in larger amounts so as to reduce afterglow to a greater extent. In U.S. Pat. No. 3,872,309 of De Belder et al., there are disclosed X-ray intensifying screens comprising a metallic substrate and a fluorescent layer. This fluorescent layer contains a fluorescent substance having the general formula:

$$M_{(w-n)}M'_nO_wX$$

wherein M is at least one of the metals yttrium, lanthanum, gadolinium, or lutetium; M' is at least one of the rare earth metals dysprosium, erbium, europium, holmium, neodymium, praseodimium, samarium, terbium, thulium, or ytterbium; X is sulphur or halogen, $n$ is 0.0002 to 0.2; and $w$ is 1 when X is halogen or is 2 when X is sulphur. But, there is no disclosure to the effect that these X-ray intensifying screens can have reduced afterglow without any appreciable loss in brightness. In any event, it is not conceivable that this invention has the above-mentioned effect, because the base of the fluorescent substance is composed of yttrium or lutetium.

Therefore, X-ray conversion screens having reduced afterglow without any appreciable loss in brightness are desired in order to overcome the deficiencies of the prior art and thereby obtain sharp images.

It is an object of this invention to provide an X-ray conversion screen which can eliminate the problem of blurred images.

It is another object of this invention to provide an X-ray conversion screen having markedly reduced afterglow without any appreciable loss in brightness.

This invention relates to X-ray conversion screens comprising a substrate and at least one fluorescent layer applied thereto, the fluorescent layer containing at least one fluorescent substance which comprises a terbium-activated lanthanum or gadolinium oxyhalide having yttrium or lutenium and, as desired, ytterbium added thereto as impurities in order to reduce afterglow without any appreciable loss in brightness. More specifically, the fluorescent substance in accordance with this invention comprises at least one rare earth oxyhalide having the general formula:

$$M_{1-\nu-w-z}OX: Tb_\nu Yb_w L_z$$

wherein M is an element selected from the group consisting of lanthanum and gadolinium; X is an element selected from the group consisting of chlorine and bromine; L is an element selected from the group consisting of yttrium and lutetium; $v$ is from 0.00005 to 0.05 mole per mole of the selected oxyhalide; $w$ is 0.005 mole or less per mole of the selected oxyhalide; and $z$ is from 0.000001 to 0.05 mole per mole of the selected oxyhalide.

This invention can be more fully understood from the following detailed description when taken in conjunction with the accompanying drawings, in which.

Figure 1:
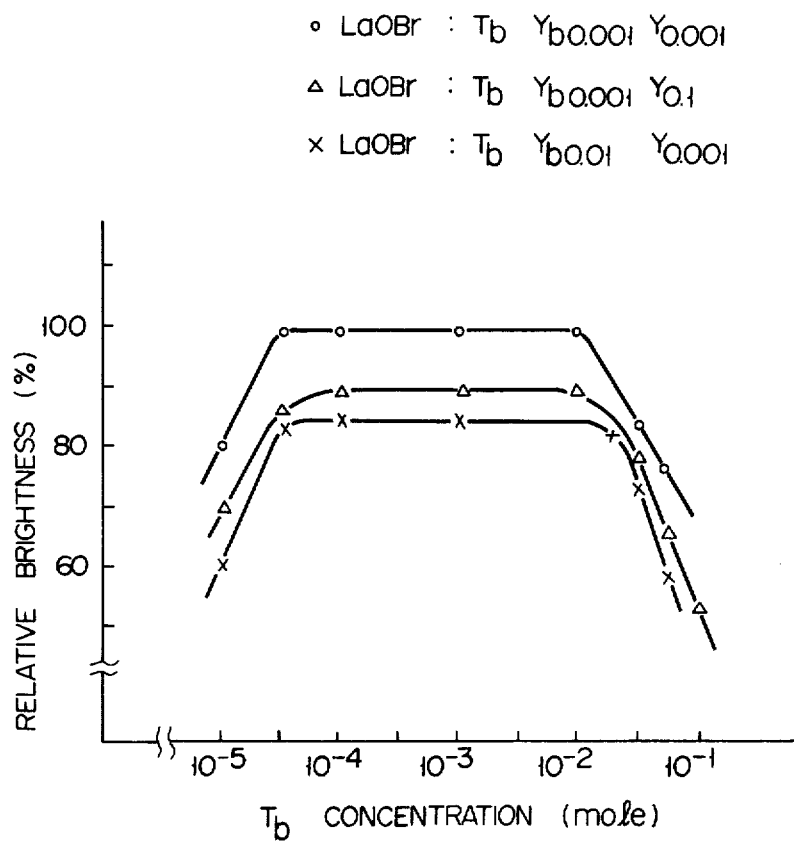
FIG. 1 is a graphical representation of the relative brightness under X-ray excitation of a fluorescent substance (LaOBr: TbYb$_{0.001}$Y$_{0.001}$) suitable for use in the X-ray conversion screens of this invention and other fluorescent substances (LaOBr: TbYb$_{0.001}$Y$_{0.1}$ and LaOBr: TbYb$_{0.01}$Y$_{0.001}$) when the Tb concentration is varied.

The terbium-activated rare earth oxyhalide fluorescent substances of this invention, which are suitable for use in X-ray conversion screens, have small amounts of selected impurities, namely ytterbium and/or yttrium or lutetium, incorporated in their crystal lattice in order to reduce their afterglow without any appreciable loss in brightness. In order to maintain their brightness, the concentration of the activator terbium is from 0.00005 to 0.05 mole and preferably from 0.0005 to 0.01 mole per mole of the selected rare earth oxyhalide. The concentrations of the impurities ytterbium, yttrium, and lutetium should be selected as a compromise between afterglow intensity and brightness. If the concentrations of these impurities are increased, a more marked reduction in afterglow will be achieved, but may be accompanied with a decrease in brightness. In particular, this tendency is more pronounced for ytterbium. Accordingly, in order to prevent any loss in brightness, the concentration of ytterbium is 0.005 mole or less and preferably 0.001 mole or less per mole of the selected rare earth oxyhalide. On the other hand, the concentration of yttrium or lutetium is from 0.000001 to 0.05 mole and preferably from 0.001 to 0.01 mole per mole of the selected rare earth oxyhalide. If the concentration of yttrium or lutetium is within the above limits, a reduction in afterglow can be achieved without any appreciable loss in brightness and, in addition, the base of the fluorescent substance will be stabilized.

The following are some examples of the rare earth oxyhalide fluorescent substance in accordance with this invention:

$La_{0.996}OBr: Tb_{0.002}Yb_{0.001}Y_{0.001}$ $La_{0.993}OCl: Tb_{0.005}Yb_{0.001}Lu_{0.001}$ $Gd_{0.993}OBr: Tb_{0.005}Yb_{0.001}Y_{0.001}$ $Gd_{0.993}OBr: Tb_{0.005}Yb_{0.001}Lu_{0.001}$

In the preparation of the fluorescent substance relating to this invention, the addition of the impurities ytterbium and/or yttrium or lutetium may be made by the oxalate precipitation method. This method is outlined below for the preparation of $La_{0.996}OBr: Tb_{0.002}Yb_{0.001}Y_{0.001}$.

In the first step of the preparation, 1,622g of lanthanum oxide, 3.739g of terbium oxide, 1.970g of ytterbium oxide, and 1.129g of yttrium oxide are dissolved in a mixture of 2,130cc of concentrated nitric acid and 8,000cc of water. This mixture is then coprecipitated with 10% oxalic acid to form the oxalates of lanthanum, terbium, ytterbium, and yttrium. The coprecipitated oxalates are then fired at 1,000° C for 2 hours to effect their conversion to mixed oxides. Thereafter, 1,000g of the resulting mixed oxides of lanthanum, terbium, ytterbium, and yttrium is blended thoroughly with 650g of ammonium bromide and fired at 425° C for 2 hours to form a terbium-activated lanthanum oxybromide containing ytterbium and yttrium. Then, 1,000g of this lanthanum oxybromide is recrystallized by thoroughly blending it with 177g of potassium bromide and refiring at 1,000° C to form a desired fluorescent substance of larger grain size. The resulting fluorescent substance is then washed to remove the potassium bromide, dried at 80° C for several hours, and finally sifted through 300 mesh.

Now, the relations between the brightness under X-ray excitation (90 kVp) and the terbium concentration of some terbium-activated rare earth oxyhalide fluorescent substances are shown in FIG. 1. The ordinate is the relative brightness calculated on the basis of the brightness of $La_{0.99795}OBr: Tb_{0.00005}Yb_{0.001}Y_{0.001}$, while the abscissa is the terbium concentration. As can be seen from FIG. 1, a sufficient brightness is obtained if the terbium concentration is within the range of from 0.00005 to 0.05 mole. In addition, the increase in the ytterbium or yttrium concentration results in a decrease in brightness, and this tendency to decreased brightness is more pronounced for ytterbium than yttrium.

The effect of ytterbium and yttrium on the reduction of afterglow properties of the fluorescent substance $LaOBr: Tb_{0.002}$ is shown in Tables I and II. Measurements of the afterglow intensity were made by exciting the X-ray fluorescent screen with X-rays (90 kVp) and leading the emitted light through a filter to a photomultiplier. Thereafter, the X-rays were cut off and the change with time of the output was read on a synchroscope. On the basis of the output under X-ray excitation, the outputs observed at predetermined intervals after the cut-off of X-rays were expressed in terms of percentage (this manner of expression of the afterglow intensity is applicable to all data that will hereinafter be given).

Table I

Effect of Yb and Y on the Reduction of Afterglow Properties of $LaOBr:Tb_{0.002}$

| Moles of Yb per Mole of Fluorescent Substance | Moles of Y per Mole of Fluorescent Substance | Relative Brightness Under X-ray excitation (%) | Afterglow Intensity (%) after Indicated Time (sec) | | | | |
|---|---|---|---|---|---|---|---|
| | | | 0.01 | 1 | 5 | 10 | 60 |
| 0.00000 | 0.00000 | 100 | 100 | 80 | 75 | 65 | 30 |
| 0.0005 | 0.00000 | 100 | 100 | 48 | 35 | 20 | 5 |
| 0.001 | 0.00000 | 97 | 100 | 45 | 32 | 15 | 1 |
| 0.005 | 0.00000 | 96 | 100 | 40 | 30 | 10 | 0 |
| 0.005 | 0.00005 | 96 | 100 | 33 | 15 | 5 | 0 |
| 0.00000 | 0.000001 | 100 | 100 | 45 | 30 | 15 | 3 |
| 0.00000 | 0.001 | 100 | 100 | 35 | 20 | 8 | 0 |
| 0.00000 | 0.01 | 100 | 100 | 34 | 18 | 5 | 0 |
| 0.00000 | 0.05 | 95 | 100 | 33 | 15 | 3 | 0 |

(The brightness of $LaOBr: Tb_{0.002}$ under X-ray excitation was taken to be 100%)

As can be seen from Table I, if the ytterbium concentration is low, the afterglow intensity after 5 seconds is not reduced to less than 30%. On the other hand, if the ytterbium concentration exceeds 0.005 mole, the relative brightness is decreased to less than 95%. Therefore, the addition of ytterbium alone is of no practical value. On the contrary, the fluorescent substance having yttrium added thereto has a reduced afterglow intensity while retaining a desirable brightness. Substantially the same results were obtained by using lutetium in place of the yttrium.

Table II

Effect of Y on the Reduction of Afterglow Properties of $LaOBr:Tb_{0.002}Yb_{0.0005}$

| Moles of Y per Mole of Fluorescent Substance | Relative Brightness under X-ray Excitation (%) | Afterglow Intensity (%) after Indicated Time (sec) | | | | |
|---|---|---|---|---|---|---|
| | | 0.01 | 1 | 5 | 10 | 60 |
| 0.00000 | 100 | 100 | 48 | 35 | 20 | 5 |
| 0.00005 | 100 | 100 | 40 | 15 | 5 | 0 |
| 0.01 | 100 | 100 | 35 | 10 | 1 | 0 |
| 0.05 | 98 | 100 | 30 | 8 | 0 | 0 |

(The brightness of the fluorescent substance when Y=0.00000 was taken to be 100%)

As can be seen from Tables I and II, the addition of ytterbium results not only in a reduction in afterglow intensity but also in a considerable decrease in brightness. However, if yttrium is used either in place of the ytterbium or in addition to the ytterbium, the afterglow intensity can be reduced without any appreciable decrease in brightness. Though not shown in these tables, the prior art terbium-activated rare earth oxyhalide fluorescent substance had a small amount of phosphorescence even 5 to 10 minutes after X-ray excitation. But, such phosphorescence was not observed in the same fluorescent substance having yttrium or lutetium added thereto in accordance with this invention.

Table III shows the effect of ytterbium and yttrium on the afterglow intensities of some other terbium-activated rare earth oxyhalide fluorescent substances.

Table III

| Composition of Fluorescent Substance | Moles of Yb per Mole of Fluorescent substance | Moles of Y per Mole of Fluorescent Substance | Relative Brightness under X-ray Excitation (%) | Afterglow Intensity (%) after Indicated Time (sec) | | | |
|---|---|---|---|---|---|---|---|
| | | | | 0.01 | 1 | 5 | 60 |
| LaOCl:Tb$_{0.005}$ | 0.00000 | 0.00000 | 100 | 100 | 65 | 45 | 7 |
| " | 0.001 | 0.00000 | 95 | 100 | 55 | 30 | 5 |
| " | 0.001 | 0.001 | 95 | 100 | 10 | 2 | 0 |
| GdOBr:Tb$_{0.005}$ | 0.00000 | 0.00000 | 100 | 100 | 80 | 58 | 13 |
| " | 0.001 | 0.00000 | 97 | 100 | 70 | 35 | 6 |
| " | 0.001 | 0.001 | 97 | 100 | 2 | 0 | 0 |
| GdOCl:Tb$_{0.005}$ | 0.00000 | 0.00000 | 100 | 100 | 40 | 31 | 5 |
| " | 0.001 | 0.00000 | 96 | 100 | 35 | 30 | 4 |
| " | 0.001 | 0.001 | 96 | 100 | 20 | 5 | 0 |

(The brightness of each fluorescent substance when Yb=Y=0.00000 was taken to be 100%)

As can be seen from Table III, the reduction in afterglow intensity resulting from the addition of yttrium is as remarkable for these rare earth oxyhalides as for the previously described lanthanum oxybromide.

Table IV shows the effect of ytterbium and lutetium on the afterglow intensities of terbium-activated rare earth oxyhalide fluorescent substances.

Table IV

| Composition of Fluorescent Substance | Moles of Yb per Mole of Fluorescent Substance | Moles of Lu per Mole of Fluorescent Substance | Relative Brightness under X-ray Excitation (%) | Afterglow Intensity (%) after Indicated Time (sec) | | | | |
|---|---|---|---|---|---|---|---|---|
| | | | | 0.01 | 1 | 5 | 10 | 60 |
| LaOBr:Tb$_{0.002}$ | 0.00000 | 0.00000 | 100 | 100 | 80 | 75 | 65 | 30 |
| " | 0.00000 | 0.05 | 95 | 100 | 45 | 25 | 10 | 0 |
| " | 0.001 | 0.00000 | 96 | 100 | 48 | 35 | 20 | 5 |
| " | 0.001 | 0.05 | 96 | 100 | 3 | 0 | 0 | 0 |
| " | 0.0005 | 0.001 | 100 | 100 | 10 | 3 | 0 | 0 |
| GdOBr:Tb$_{0.005}$ | 0.00000 | 0.00000 | 100 | 100 | 80 | 58 | 40 | 13 |
| " | 0.001 | 0.00000 | 97 | 100 | 65 | 33 | 15 | 5 |
| " | 0.001 | 0.05 | 97 | 100 | 1 | 0 | 0 | 0 |
| " | 0.0005 | 0.001 | 100 | 100 | 5 | 0 | 0 | 0 |
| LaOCl:Tb$_{0.005}$ | 0.00000 | 0.00000 | 100 | 100 | 65 | 45 | 30 | 7 |
| " | 0.001 | 0.00000 | 95 | 100 | 55 | 30 | 10 | 4 |
| " | 0.001 | 0.05 | 95 | 100 | 5 | 0 | 0 | 0 |
| " | 0.0005 | 0.001 | 100 | 100 | 10 | 2 | 0 | 0 |
| CdOCl:Tb$_{0.005}$ | 0.00000 | 0.00000 | 100 | 100 | 50 | 35 | 10 | 5 |
| " | 0.001 | 0.00000 | 98 | 100 | 45 | 30 | 5 | 1 |
| " | 0.001 | 0.002 | 98 | 100 | 1 | 0 | 0 | 0 |

(The brightness of each fluorescent substance when Yb=Lu=0.00000 was taken to be 100%)

As can be seen from Table IV, the afterglow of the fluorescent substances can be markedly reduced by the addition of both ytterbium and lutetium.

The above-mentioned results have revealed that, if adequate amounts of ytterbium and/or yttrium or lutetium are added, the afterglow of terbium-activated rare earth oxyhalide fluorescent substances will be reduced without any appreciable loss in brightness whereby fluorescent substances suitable for use in X-ray conversion screens will be obtained.

Moreover, the addition of yttrium or lutetium will improve the stability of the rare earth oxyhalide fluorescent substances against water and hence the life properties of the fluorescent layer in X-ray conversion screens having these fluoresent substances incorporated therein. For example, if X-ray intensifying screens are to be stored or used in a highly humid atmosphere over a long period of time, this improvement in life properties will have a practically important significance.

Now, the X-ray conversion screens of this invention will be described in detail. These X-ray conversion screens are constructed in the same manner and made by the same method as the conventional ones, except that any of the above-described rare earth oxyhalides activated with terbium having yttrium or lutetium added thereto is employed as the fluorescent substance contained in the fluorescent layer. For the substrates of these X-ray conversion screens, any of the materials heretofore in use, such as paper, plastic film, metal, glass, and the like, may be suitably selected and employed according to their uses.

The X-ray conversion screens of this invention may have two or more fluorescent layers which are arranged in such a manner that the layer nearer to the substrate contains a fluorescent substance of larger grain size. Such X-ray conversion screens are advantageous in that the graininess of the fluoresent surface is improved and the non-uniform emission resulting from the quantum noises of X-rays is minimized.

The fluorescent substance used in the X-ray conversion screens of this invention may consist of one or more rare earth oxyhalides as disclosed herein, and may also consist of a mixture of a rare earth oxyhalide as disclosed herein and at least one conventional phosphor. For example, mixtures of a rare earth oxyhalide as disclosed herein and at least one of the phosphors Ca- WO$_4$, BaSO$_4$: Eu, or Ba$_3$(PO$_4$)$_2$: Eu may be employed in order to obtain X-ray conversion screens having a higher resolving power. In addition, mixtures of a rare earth oxyhalide as disclosed herein and at least one of the terbium-activated yttrium, lanthanum, or gadolinium oxysulfide phosphors (i.e., Y$_2$O$_2$S:Tb, La$_2$O$_2$S:Tb, Gd$_2$O$_2$S:Tb) or the phosphor BaFCl:Eu may be employed in order to obtain X-ray conversion screens having a higher sensitivity.

The X-ray conversion screen of this invention will be more specifically exemplified below by an X-ray intensifying screen suitable for use in X-ray photographic devices.

Figure 2:
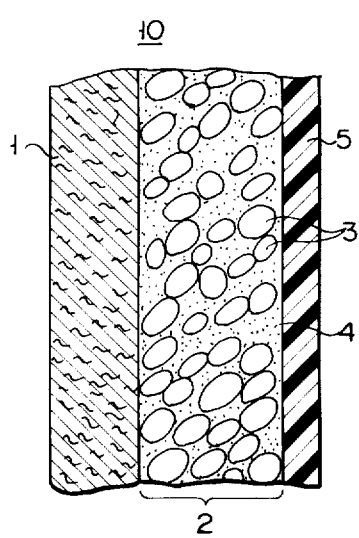
FIG. 2 is an enlarged sectional view of an X-ray intensifying screen made in accordance with this invention.

FIG. 2 shows an X-ray intensifying screen 10 having one fluorescent layer made in accordance with this invention. The X-ray intensifying screen 10 which is constructed in a conventional manner comprises a substrate 1, such as plastic film sheet, having a thickness of about 150 to 200μm. On the substrate 1 are formed a fluorescent layer 2, to which a protective coating 5 is laminated. The above-mentioned fluorescent layer 2 consists of phosphor grains 3 and a binder 4, such as cellulose nitrate, for depositing the phosphor grains in the form of a layer. The above-mentioned protective coating 5, which is provided for the purpose of protecting the surface of fluorescent layer 2 from damage, consists of, for example, a Mylar or cellulose acetate resin film having a thickness of about 10μm.

Figure 3:
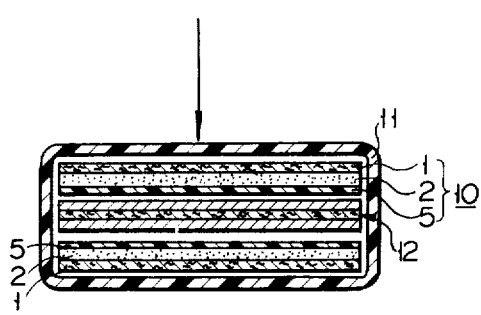
FIG. 3 is a schematic sectional view of the X-ray intensifying screen of this invention being used in combination with an X-ray photographic film.

The so constructed X-ray intensifying screen 10 is used in the manner shown in FIG. 3. That is, the X-ray intensifying screen 10 is generally disposed on each side of an X-ray photographic film 12 which is coated on both surfaces with a silver halide emulsion and loaded in a container 11 commonly known as "casette." When this cassette 11 is disposed at the back of the patient, the X-rays (expressed by the arrows) radiating from an X-ray tube and passing through the body of the patient cause the X-ray intensifying screens 10 to emit light, whereby the X-ray photographic film 12 becomes exposed.

In the following, one method for making such an X-ray intensifying screen is described by way of illustration.

About 10% by volume of grains of a rare earth oxyhalide phosphor are dispersed in a binder consisting mainly of cellulose nitrate. The dispersed phosphor is deposited on a substrate to form a fluorescent layer. The amount of deposited phosphor should be determined according to the desired sensitivity, and normally is of the order of 30 to 300mg/cm². In order to form a protective coating, a cellulose acetate resin film having a thickness of about 10μm is laminated to the above-mentioned fluorescent layer with the aid of a suitable adhesive.

In the case of input screens used in X-ray image intensifier tubes, an improved resolution can advantageously be achieved if the fluorescent layer is formed by the vapor deposition of a fluorescent substance.

In an X-ray intensifying screen made in accordance with this invention, not only its afterglow was markedly reduced without any appreciable loss in brightness, but also its resolution and contrast were considerably enhanced as compared with a prior art X-ray intensifying screen employing LaOBr:Tb.

Table V

| Resolution Power of X-ray Intensifying Screen | |
|---|---|
| This invention | 5 lp/mm |
| Prior art : | 3 lp/mm |

What we claim is:

1. An X-ray conversion screen comprising a substrate and at least one fluorescent layer applied thereto, said fluorescent layer containing at least one fluorescent substance which comprises a rare earth oxyhalide having the general formula:

$$M_{1-v-w-z}OX: Tb_v Yb_w L_z$$

wherein M is an element selected from the group consisting of lanthanum and gadolinium; X is an element selected from the group consisting of chlorine and bromine; L is an element selected from the group consisting of yttrium and lutetium; $v$ is from 0.00005 to 0.05 mole per mole of the selected oxyhalide; $w$ is not more than 0.005 mole per mole of the selected oxyhalide; and $z$ is from 0.000001 to 0.05 mole per mole of the selected oxyhalide.

2. An X-ray conversion screen according to claim 1 wherein $v$ is from 0.0005 to 0.01 mole per mole of the selected oxyhalide.

3. An X-ray conversion screen according to claim 1 wherein $w$ is not more than 0.001 mole per mole of the selected oxyhalide.

4. An X-ray conversion screen according to claim 1 wherein $z$ is from 0.001 to 0.01 mole per mole of the selected oxyhalide.

5. An X-ray conversion screen according to claim 1 wherein said rare earth oxyhalide does not contain ytterbium.

6. An X-ray conversion screen according to claim 1 having at least two fluorescent layers which are arranged in such a manner that the fluorescent layer nearer to said substrate contains a fluorescent substance of larger grain size.

7. An X-ray conversion screen according to claim 1 wherein said fluorescent substance consists of a mixture of said rare earth oxyhalide and at least one member selected from the group consisting of CaWO$_4$, BaSO$_4$:Eu, and Ba$_3$(PO$_4$)$_2$:Eu.

8. An X-ray conversion screen according to claim 1 wherein said fluorescent substance consists of a mixture of said rare earth oxyhalide and at least one member selected from the group consisting of Y$_2$O$_2$S:Tb, La$_2$O$_2$S:Tb, Gd$_2$O$_2$S:Tb, and BaFCl:Eu.

* * * * *